March 27, 1951 J. SAYERS 2,546,870

HIGH-FREQUENCY ELECTRICAL OSCILLATOR

Filed Feb. 9, 1945 6 Sheets-Sheet 1

Inventor:
James Sayers,
By Cushman, Darby & Cushman
Attorneys.

March 27, 1951 J. SAYERS 2,546,870

HIGH-FREQUENCY ELECTRICAL OSCILLATOR

Filed Feb. 9, 1945 6 Sheets-Sheet 2

Inventor:

James Sayers,

By Cushman, Darby & Cushman

Attorneys.

March 27, 1951 J. SAYERS 2,546,870

HIGH-FREQUENCY ELECTRICAL OSCILLATOR

Filed Feb. 9, 1945 6 Sheets-Sheet 3

Inventor:

James Sayers,

By Cushman, Darby & Cushman

Attorneys.

March 27, 1951 J. SAYERS 2,546,870

HIGH-FREQUENCY ELECTRICAL OSCILLATOR

Filed Feb. 9, 1945 6 Sheets-Sheet 4

Inventor:

James Sayers,

By Cushman, Darby & Cushman

Attorneys.

Inventor:

James Sayers,

By Anderson, Darby & Anderson

Attorneys.

Inventor:

James Sayers,

By Cushman, Darby & Cushman

Attorneys.

Patented Mar. 27, 1951

2,546,870

UNITED STATES PATENT OFFICE 2,546,870

HIGH-FREQUENCY ELECTRICAL OSCILLATOR

James Sayers, Birmingham, England, assignor to English Electric Valve Company Limited, Chelmsford, England, a company of Great Britain Application February 9, 1945, Serial No. 577,067
In Great Britain October 3, 1941

Section 1, Public Law 690, August 8, 1946
Patent expires October 3, 1961

6 Claims. (Cl. 315—40)

This invention relates to high frequency electrical oscillators and, more particularly, to such oscillators of the magnetron type in which a plurality of resonators, generally of substantially the same natural frequency, are arranged in juxtaposition to a cathode and to each other, by virtue of which last mentioned relationship they are electrically coupled together, such resonators being thrown into a state of oscillation, by virtue of the reaction therewith of the electron stream, when the device is operated with suitable means for producing a magnetic field and voltage applied thereto.

In the best-known sub-class of the magnetron type the resonators take the form of cavities disposed about a central anode-cathode space into which the cavities open by gaps or slots, the cavities being electromagnetically coupled when the device is in operation. The construction covered by application of Randall and Boot, Serial No. 407,680, filed August 20, 1941, now Patent No. 2,542,966, dated February 20, 1951, is an important example of this sub-class. In this construction each resonator may be of circular form in cross-section, with a relatively small gap opening into the anode-cathode space or, alternatively, other forms of resonator may be employed, such as resonators taking the form of radial slots extending outwardly from the central space. In the particular construction described in the said application, also the resonator cavities are coupled together, not only by the gaps opening into the central space but additionally by other means, specifically by a common end space, at one or both ends of the device, into which said resonator cavities and central space open.

Various modified forms of the type of device referred to exist, in some of which the resonators, either in the form of cavities in a block, or of solid rods, are arranged in line with each other, parallel to and at one side of the cathode, while in a further sub-class of the general type the resonators take the form of rods disposed circumferentially around the cathode. The improvements herein described may advantageously be applied to the above-mentioned and other forms of the type of magnetron device described.

It has been found that magnetrons of the character described above, when in use as generators of oscillations, tend to oscillate in a variety of different modes and therefore at a plurality of different frequencies, even when the resonators are approximately of the same natural frequency individually. This occurs when changes occur in the operating conditions, such for example, as variations in the electron current, anode voltage, or magnetic field. Thus the magnetron may oscillate in several or all of the said modes either simultaneously or separately, and may change from one mode to another, with a corresponding change in the frequency generated for only a slight change in the operating conditions imposed. It may be said in explanation that the modes of oscillation referred to are characterised by different phase relations between different points or regions of the resonator system, a property of a mode being a specific oscillatory frequency. Such a frequency requires specific operating conditions to excite it, but in practice such conditions tend to overlap or change in such a way as to produce the effects noted. It may be remarked that the simultaneous operation referred to above does not often occur in practice but may do so if the operating conditions overlap to a large extent.

The purpose of the present invention is the improvement of such magnetrons by the provision of means for constraining them to generate oscillations in one or more particular modes to the exclusion of others over a wide range of operating conditions. This range may cover, for example, a variation in anode current in the ratio of 3 to 1, and in applied anode voltage of 2 to 1. An important application of the invention is the restriction of the possible modes of oscillation to one only, while operating within the range of operating conditions which are suitable for the given case, namely that giving the greatest efficiency.

It should be added that while the last mentioned application is of chief importance, the production of more than one mode (and consequently more than one frequency), to the exclusion of others, is of practical value in special cases. Thus for example it may be desirable to have a magnetron transmitter arranged to operate alternately on two frequency channels, the change-over being effected by an appropriate change in, say, the anode voltage.

According to the invention the said purpose is effected by the provision of electrical coupling means between selected points (or more properly speaking, regions) of the resonator system. These coupling means (direct electrical connections or equivalent coupling means) are arranged in such a way that relative frequencies of the various modes of oscillation are changed thereby, being distributed further apart. In addition such couplings, suitably arranged, result in the distribution of amplitude among the resonator elements being largely confused for some modes while no deterioration takes place for the desired modes. In many cases, in fact, a more uniform distribution of amplitude of oscillation among the resonators of the system for a required mode of operation may be accomplished, thereby increasing efficiency.

For example, in the particular case in which the length of a direct connection between two adjacent junction points in the resonator system is short compared with a wave-length (considerably shorter than one-half of the free space wave-length at which the device is designed to operate) if the points so connected would require to oscillate at the same amplitude and phase for a particular mode, this mode will not be distorted by the connections, whereas other modes may be so affected that their generation by the magnetron will become improbable or impossible.

In order that the invention may be more clearly understood attention is directed to the accompanying drawings, illustrating, by way of example, certain embodiments of the invention. In the drawings.

Figure 5:
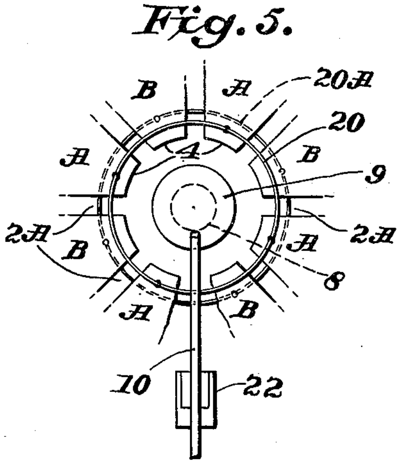
Fig. 5 is a cross sectional view taken on line 1—1 of Fig. 4 to a different scale from Fig. 1, this being made somewhat diagrammatic for the purpose of showing the arrangement of connections between segments more clearly.
Figure 6:
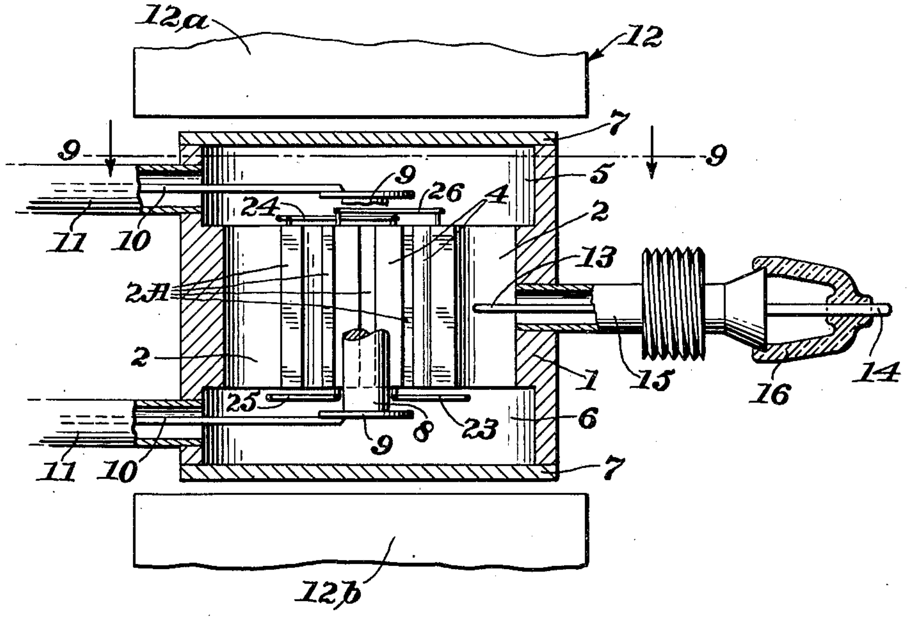
Figs 6, 7 and 8 are views similar to that shown in Fig. 4 of alternative constructions in which different arrangements of connections between segments (hereinafter termed "straps") are shown.
Figure 7:
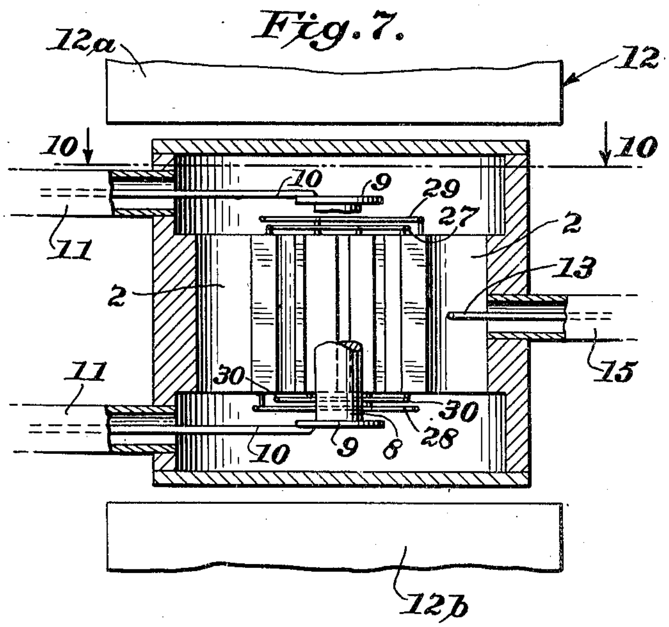
Figure 8:
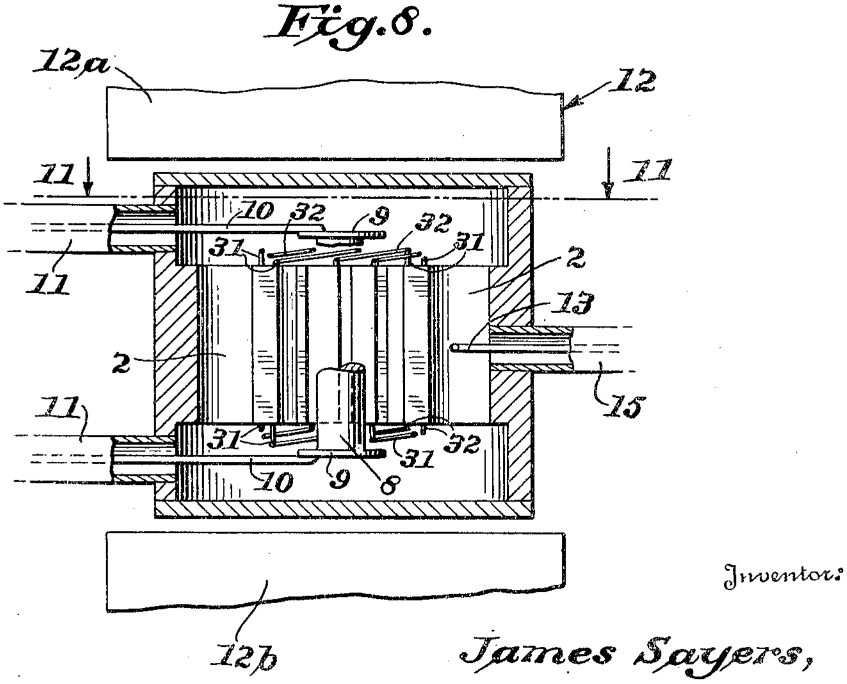
Figure 9:
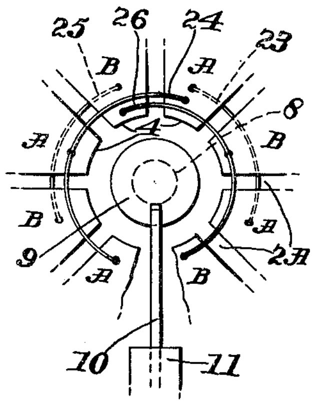
Figure 10:
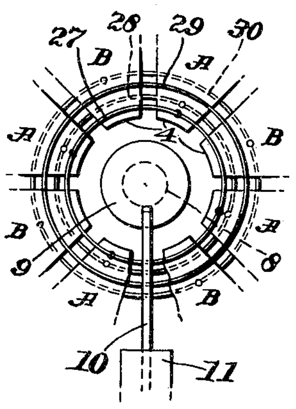
Figure 11:
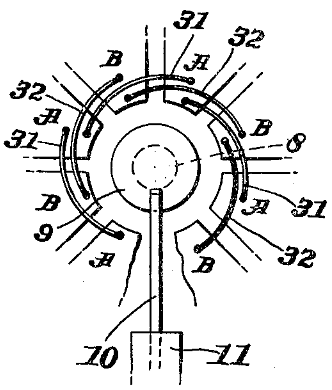

Figs. 9 10, and 11 are cross sectional views taken on lines 9—9 in Fig. 6, 10—10 in Fig. 7, and 11—11 in Fig. 8, respectively, these views being similar to that shown in Fig. 5.

Figure 4:
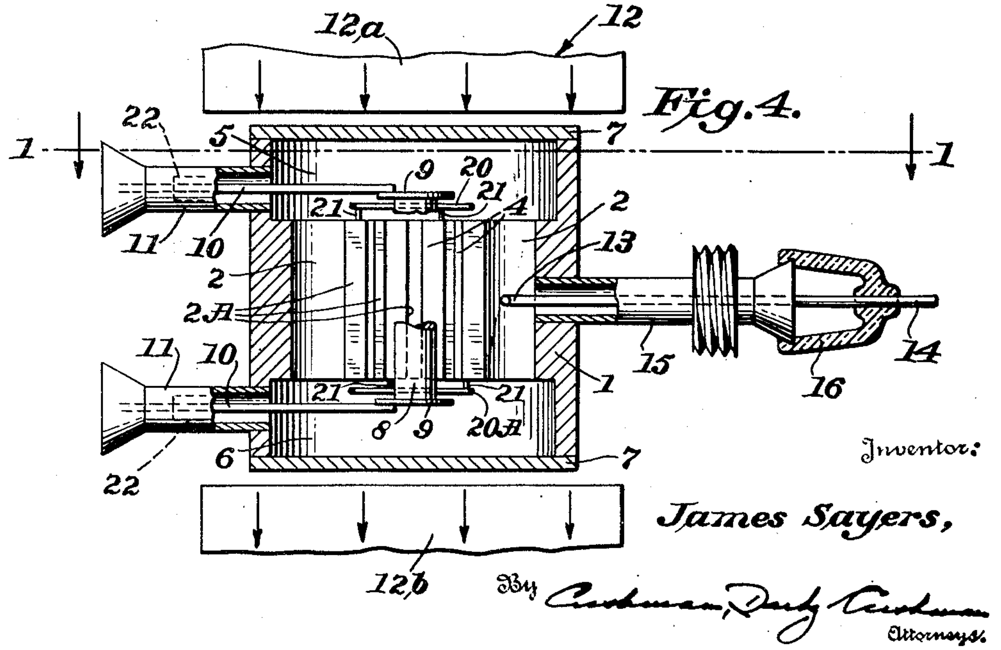
Fig. 4 is a longitudinal section taken on line 4—4 of Fig. 1.
Figure 12:
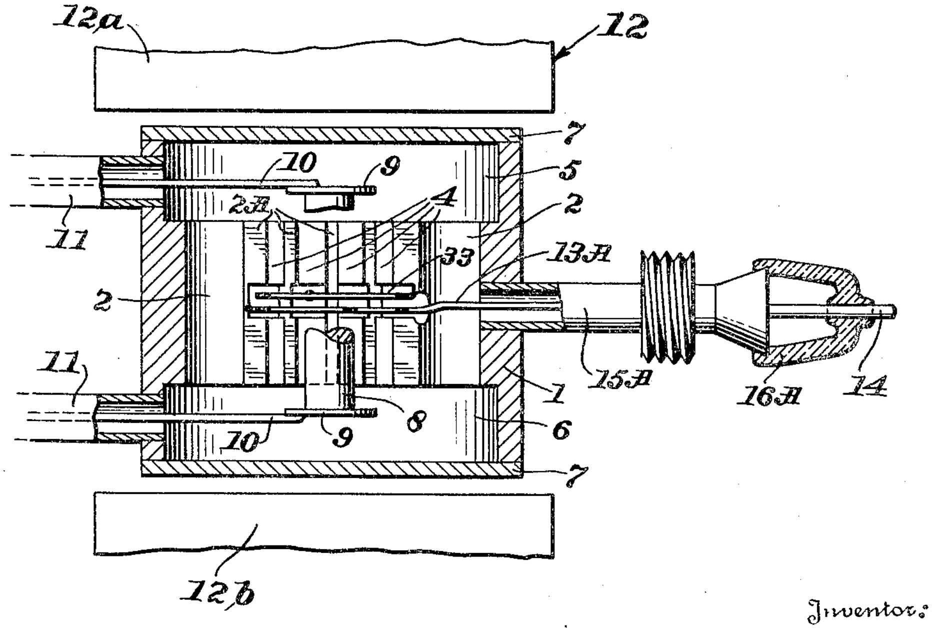

Fig. 12 is a view similar to that shown in Fig. 4, but showing a modified positioning of the straps.

Figure 13:
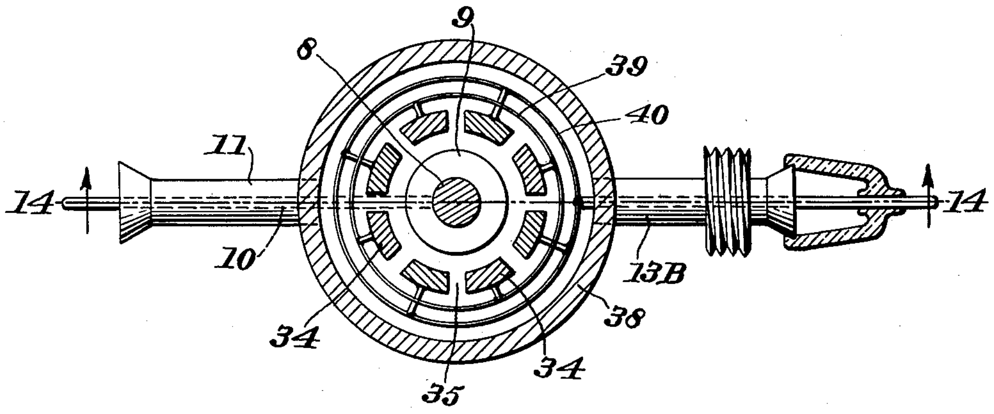
Figure 14:
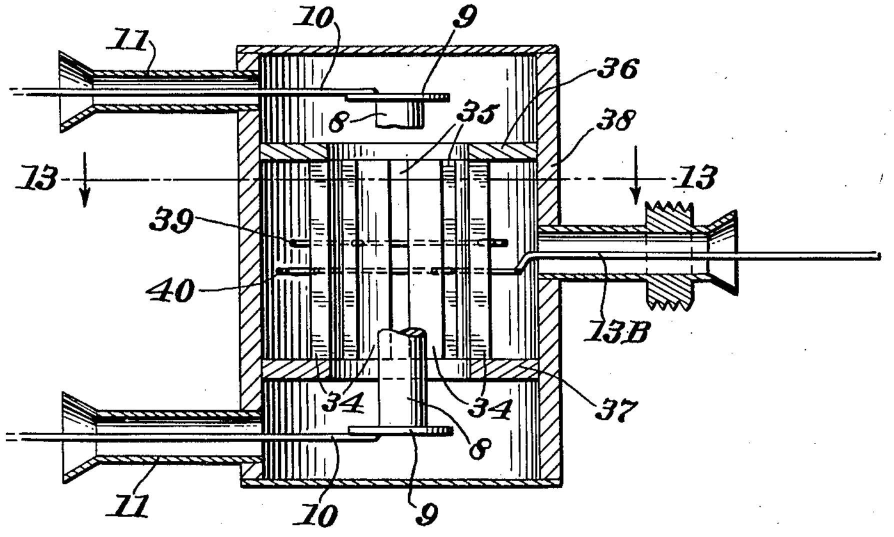

Fig. 13 is a cross sectional view of an alternative magnetron construction in which the resonator elements are bars or rods surrounding the cathode, this view being taken on line 13—13 of Fig. 14 and being somewhat diagrammatic in the same manner as Figs. 5 and 9 to 11.

Fig. 14 is a longitudinal section taken on line 14—14 of Fig. 13.

Figure 15:
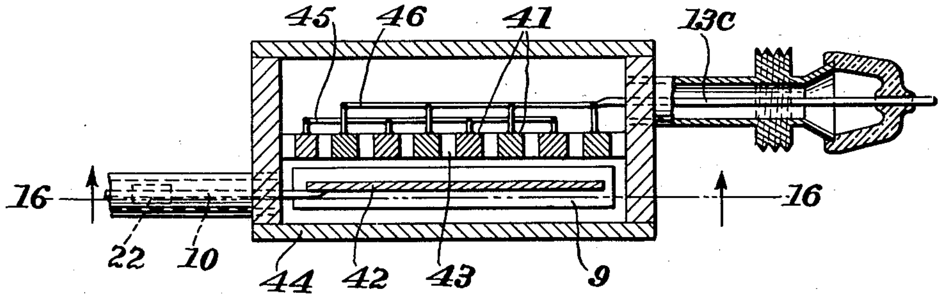
Figure 16:
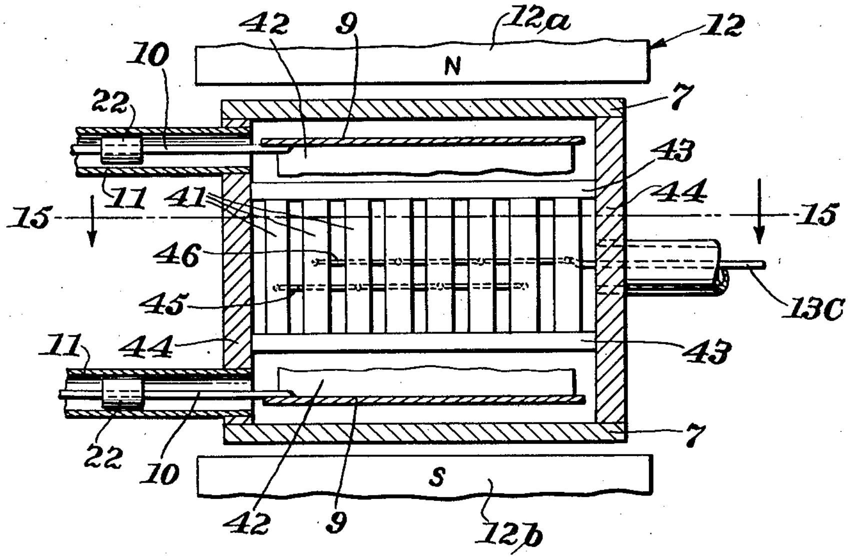

Fig. 15 is a cross sectional view of a further alternative magnetron construction in which the resonator elements are bars or rods arranged in a straight line, parallel to a plane cathode, this figure being taken on line 15—15 of Fig. 16, and also being somewhat diagrammatic, and Fig. 16 is a longitudinal section taken on line 16—16 of Fig. 15, but with the central portion of the cathode omitted.

Figure 1:
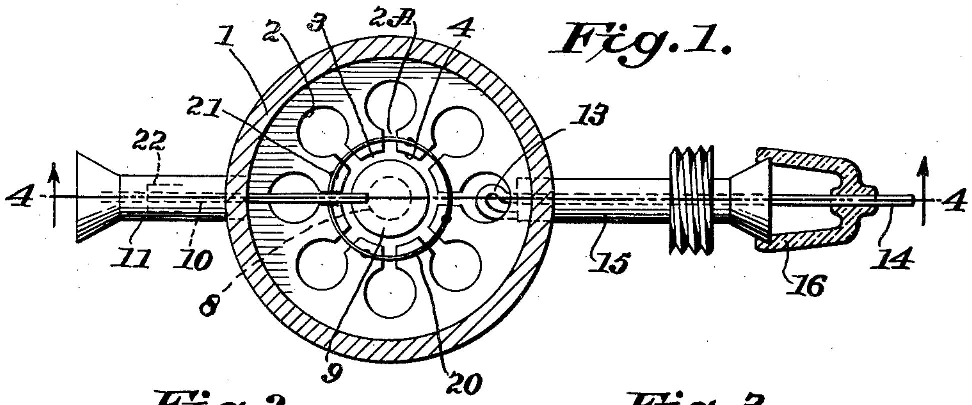
Fig. 1 is a cross sectional view through a magnetron of the type shown in said Randall and Boot application, embodying one form of the invention, this being taken on line 1—1 of Fig. 4.

Referring to the drawings, Figs. 1 and 4 show, by way of example, a magnetron of the type described in said application of Randall and Boot, in which the anode block 1 has a plurality of cylindrical resonator cavities 2 drilled or otherwise formed therein. These cavities as shown are disposed about the central anode-cathode space 3, each of them opening into said space by a relatively narrow gap or slot 2A. The gaps 2A thus divide the bounding wall of the central space 3 into a plurality of segments 4. In the construction shown the central axial space 3 and the resonator cavities 2 all open at their opposite ends into common end spaces 5 and 6. In that construction, also, the end spaces are closed by end caps 7 of conducting material. The cathode 8, shown in elevation and partly broken away, is mounted axially in the central space and is provided with shields 9 at its ends to prevent passage of stray electrons into the end spaces. The cathode connections 10 are shown going through tubes 11 in the side walls of the end spaces. An electromagnet 12 is indicated as having its pole pieces 12*a* and 12*b* in close proximity to (but insulated from) the two end caps 7 so as to provide a magnetic field axially of the device. Power output is provided for, for example by a copper loop 13 in one of the resonator cavities 2, this serving to pick up energy by virtue of its electromagnetic coupling with the resonator system. One end of the loop 13 is connected to the main anode block while the other end passes out through an opening in the anode block and is soldered to a tungsten wire 14, which passes through a copper tube 15 sealed in a Pyrex cap 16.

If the width of each segment 4 which separates an adjacent pair of slots 2A connecting resonator cavities 2 with the central space 3 is sufficiently small with respect to the wave length (considerably less than one quarter the free space wave length which the device is intended to generate), all points on a given segment face must be at substantially the same potential at a given instant, and this condition will be assumed to hold in the following general discussion of preferred applications of the present invention.

Figure 2:
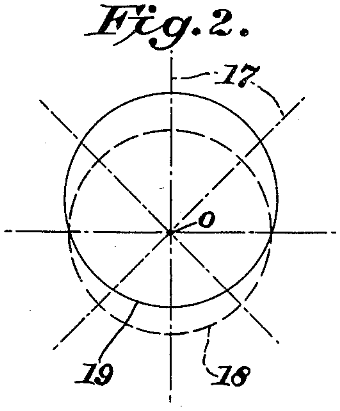
Fig. 2 and 3 are polar diagrams illustrating possible modes of oscillation.
Figure 3:
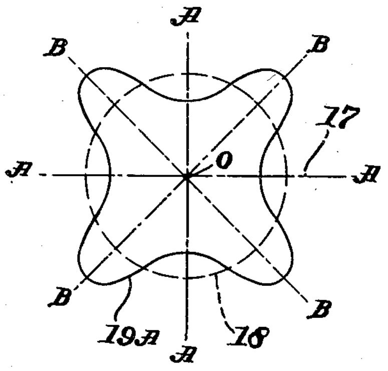

A theoretical explanation must first be given before describing specific examples of electrical connections (or other coupling means) comprised within the invention. Under the conditions just referred to it is found, in general, that any possible mode of oscillation of the magnetron may be resolved into one or more components each of which may be represented by a rotating wave form. This conception will be more readily understood by referring to Figs. 2 and 3 which are polar diagrams in which the dotted radial lines 17 in each figure represent the angular positions of the segments 4 in Fig. 1, while the intercept on each such line between the points where it cuts the dotted datum circle 18, in each figure, and the curve 19 in Fig. 2 or curve 19A in Fig. 3 represents the instantaneous potential of the segment in question, curves 19 and 19A being different wave forms produced under different conditions, as will be explained. The circle 18 in each case represents anode potential, so that points outside it represent potentials higher than, and points inside it potentials lower than anode potential. The curves 19 and 19A are such that an exact representation of the sinusoidal potential variations on each segment when the magnetron is oscillating is obtained if these curves are rotated uniformly about the centre 0 with an angular velocity proportional to the frequency.

In general, the total change of phase at a given segment for one complete revolution of a curve 19 or 19A may be represented by $2\pi n$, where $n$ is a positive integer. Thus Figs. 2 and 3 represent the cases where $n=1$ and $n=4$ respectively, and it will readily be appreciated that curves may similarly be constructed for any other value of $n$.

Letting N represent the total number of resonators, a common case is represented by $n=N/2$; in this mode, if alternate segments are represented by A and B, all the A segments will oscillate in phase with one another and $\pi$ radians out of phase with the B set as shown in Fig. 3, and this mode may accordingly be termed the $\pi$ mode.

Any possible mode or frequency of oscillation can be represented by a curve such as 19 or 19A, or by the resultant of two or more of such curves, rotating in the appropriate directions and with the appropriate angular velocities. Thus a case in which one set of segments (say the B set) all remain at constant potential, while alternate members of the remaining set (i. e., the A set) behave as the A and B segments for the $\pi$ mode, may be represented by the resultant of two similar curves having $n=N/4$ which are rotating with equal angular velocities in opposite directions. This represents a possible, but very inefficient, mode of operation of magnetrons of the type referred to.

In Figures 1 and 4 are illustrated a preferred form of strap or direct connection between segments of the device according to the invention, such a strap comprising a conductor 20, which may be positioned, as shown, within one of the end spaces 5, of the magnetron in a plane substantially normal to the axis of the magnetron; the strap may be of annular or part annular form, its centre of curvature coinciding approximately with the said axis. The strap 20 (when the coupling means takes the form of a direct connection, as shown), is connected by two or more short longitudinal conductors 21, to the appropriate segments 4; in cases where only two conductors 21, are employed, one at each end of the conductor 20, they may, of course, be formed integrally therewith.

The complete strapping arrangement may, in general, comprise one or more straps as described above arranged in one or both of the end spaces 5 and 6. Various alternative arrangements all directed to the production of the $\pi$ mode (which is highly efficient and is therefore, in most cases, the preferred mode of operation) will now be described. All of these arrangements have for their object to connect together all of the A segments as one group (or at least to thus connect the greater number of them, the others remaining unconnected, which has much the same effect) and all the B segments as another group or the greater part of them (the same as with the A group), by connecting straps whose lengths are small relative to the wave length of the oscillation. In this manner all the A segments are constrained to oscillate in phase with one another and all the B segments are similarly constrained, the only mode consistent with this arrangement being the required $\pi$ mode. The effect, as stated above, will be as described when some only of the A segments and some only of the B segments are coupled together, because the phase relationship imposed thereby upon the segments so connected makes it impossible for the unconnected segments to oscillate in any other mode than that imposed by the coupling upon the coupled members.

One such arrangement is shown in Figs. 1, 4 and 5. The last named figure (as well as Figs. 9, 10 and 11, which are presently to be referred to) is a somewhat diagrammatic drawing showing the segments, strapping arrangements and cathode connections, connections at one end being shown by full lines and those at the other by dotted lines. The positions of the conductors 21 connecting the straps to the segments are shown by dots superimposed on the lines representing the straps, and similarly, purely for ease of illustration, circular or part circular straps are shown as having different diameters at the two ends. In Fig. 5 and in the similar figures, 9, 10 and 11, parts of certain segments 4 at the bottom of each figure are cut away to show the radially disposed cathode connections 10.

As shown in Figs. 1, 4 and 5 all the A segments are connected by a circular strap 20 at one end and all the B segments by a similar strap 20A at the other end. This arrangement results in a longitudinal alternating electric field being set up between the straps which tend to induce longitudinal oscillatory currents in the cathode and thus to give rise to a loss of power. Such a loss may be obviated however, by the insertion of high frequency chokes in the cathode connections 10 as indicated at 22 in Figs. 4 and 5. Alternative arrangements, designed to bring about the cancellation of such longitudinal fields, are shown in Figs. 6 to 11.

According to the arrangements shown in Figs. 6 and 9, in its application to an 8-segment magnetron, half of the A segments are united by an arcuate strap 23 positioned in one end space, and the remainder of the A segments, plus one of those already connected by strap 23, are united by a similar strap 24 positioned in the other end space. The B set is similarly treated by means of straps 25 and 26 so that each end space contains both A and B straps. Simply for clarity in the drawing, Figure 6 shows the straps 24 and 26 as lying in different planes. If the magnetron has such a number of segments that N/2 is odd, the strap 23 will connect $(N-2)/4$ segments, N denoting the total number of segments, as before. In this manner the longitudinal fields set up by the strap cancel out, and only transverse fields, which produce negligible losses by induction in the cathode connections, are left in each end space. In cases where the cathode connections 10 are brought into the end spaces at right angles to the axis of the magnetron, as is shown in these figures, such connections must also be arranged at right angles to the transverse fields produced between the A and B straps if inductive losses are to be avoided.

Figs. 7 and 10 show a modification in which all the A segments are connected (or the greater number of them, as previously explained) both by a complete circular strap 27 at one end and by a similar strap 28 at the other end, the B segments being similarly connected by straps 29 and 30. It will be seen that this arrangement results in a cancellation of both the longitudinal and transverse fields.

In a still further modification, illustrated in Figs. 8 and 11, all the A segments are united in pairs by a series of straps 31, and the B segments are similarly united by a series of straps 32, all of these straps preferably being arranged in an echelon formation as shown. This formation should be provided at each end, in the construction shown, as is indicated in the drawings. The sense of rotation of the echelon formation is not important, that is, each end may appear as illustrated in Fig. 11, or one end may appear as is there illustrated while the other end appears as a mirror image of this formation. The result of this construction also is that no resultant transverse or longitudinal fields are set up.

The invention is not confined to the particular constructional arrangement of straps (or of equivalent couplings) heretofore described. Straps may be located, for example, in a circumferential groove in the anode block arranged in the position indicated at 33 in Fig. 12. Any suitable arrangement of the straps may be adopted when they are thus positioned; for example, two annular straps may be employed, these straps being connected to the segments in a manner corresponding with that shown in Fig. 5. If convenient the straps may be formed integrally with the resonator system; in the type of magnetron in which the resonator system is built up of a number of thin laminae soldered or pressed together, for example, as is described in said application of Randall and Boot, the straps may be embodied in one or more of the laminae and may be located at any desired position in the resonator system.

Strapping may be applied to magnetrons which are not capable of oscillating in the $\pi$ mode. For example, magnetrons having an odd number of resonators cannot oscillate in the $\pi$ mode as described, operation in this case involving phase differences of other than $\pi$ radians between adjoining segments. In this case echelon strapping as illustrated in Figs. 8 and 11 may usefully be employed, and consideration of the properties of the electrical circuit shows that a substantial mode separation, of the order of 15 degrees in frequency, can be achieved.

In the case of a magnetron whose resonator system consists of parallel rods disposed circumferentially around the cathode, straps of any of the forms already described may be used, but in this case the operation of the magnetron will involve longitudinal oscillations of the rods such that there will be regions where the amplitude of the electric field between the rods is zero, and other regions where the amplitude of the said field is a maximum. The straps should be located at one of the latter regions. Figs. 13 and 14 illustrate, by way of example, the application of one form of strapping to this case. As is there shown, the rods 34 extend circumferentially around the cathode 8, these rods being separated by spaces 35. The rods must of course be mounted and secured in position in the magnetron and in the case illustrated they are mounted by being secured at their respective ends to rings 36 and 37 which are themselves secured to the cylindrical electrically conducting casing 38 of the device. In this case, the rods being all connected together at their ends, the regions of zero amplitude of the field referred to will be at the ends, and the straps in this case will be placed near the mid-points of the rods. The straps, indicated at 39 and 40, may be mounted in the space between the rods and the outer enclosing wall 38, strap 39 being connected to alternate rods, as shown, and insulated from the others, while strap 40 is connected to those others, and insulated from the rods to which strap 39 is connected. It will be seen that the arrangement is similar to that of the cavity resonator magnetron described in connection with Figs. 1, 4, and 5, the rods being analogous to the segments 7 in the first case, divided into A and B groups, the spaces 35 between the rods being analogous to the slots 2A in the first case (the diameters of the rods being sufficiently small with respect to the wavelength, as described in connection with the cavity resonator instruction), the rods oscillating in the $\pi$ mode, as previously described. If alternatively, the rods were rigidly connected together at their mid-points, the maximum electric field would occur at their ends, and the straps would then be fixed at the ends.

With the arrangement illustrated, the other details of the construction may be the same as has already been described in connection with the cavity resonator, the output line being shown as provided with a direct tap on to one of the straps, as is indicated at 13B in Fig. 14, this being similar to the arrangement shown in Fig. 12, referred to hereafter.

In the case of a magnetron resonator system having rods or cavities arranged in a straight line, the arrangement is similar to a small sector of a cylindrical magnetron of very large diameter. The cathode is then a plane surface parallel to the anode and adjacent to the rods or cavity openings. Such an arrangement, where the resonators are rods, is indicated in Figs. 15 and 16. As is there indicated, the rods 41 are arranged parallel to the plane cathode 42, the rods being secured together at top and bottom by members 43, which are secured at their ends to the enclosing structure 44, this entire conducting structure, together with the rods, constituting the anode.

The rods in this case may be strapped together in any suitable way, for example, in the same manner as has just been described in the case of the circumferential rods, in the structure shown in Figs. 13 and 14. This arrangement is here illustrated, where strap 45 connects alternate rods, and is insulated from the others, while the strap 46 connects these others and is insulated from the rods to which strap 45 is connected, these straps being mounted on the side of the rods remote from the cathode and adjacent to the mid-points of the rods as described in connection with Figs. 13 and 14. The other details of the construction may be the same as previously described, the output line being provided with a direct tap 13c, on to one of the straps.

It will be observed that in all of the arrangements referred to, comprising either cavity or rod resonators, the resonators are in juxtaposition to a cathode and to each other by reason of which last mentioned relationship they are all electrically coupled together, the strapping arrangements described constituting additional electrical coupling means between different members or regions of the system.

The invention is particularly useful in cases in which the resonator block has been very inaccurately machined, when the differences between individual resonators may result in the frequency response curve of the system as a whole having a large number of separate resonance peaks. This corresponds with the excitation of complex modes resulting from the superimposition of various modes in different proportions. Under these conditions the use of connecting straps as described above will result in the suppression of all but the required mode of oscillation and largely compensate for the machining inaccuracies.

A further advantage of the invention resides in the fact that a direct tap of the output line on to one of the straps will provide a more nearly ideal loading than a coupling loop or direct tap associated with one of the resonators alone. Such a tap is indicated in Fig. 12 at 13A, this passing out of the magnetron through a tube 15A, as shown. Moreover, if either this or the direct tap to one resonator is used for the transmission of the output power, the effect of the straps will be to balance out variations of amplitude due to increased damping of the resonators in the neighbourhood of the output connection.

I claim:

1. A high-frequency magnetron device comprising a cathode, a plurality of resonators in juxtaposition thereto, all conductively interconnected, and electrically coupled when in operation, and constituting a system which is capable of oscillating in a plurality of different modes at the frequencies appertaining thereto, said resonator system having surfaces adjacent to which an alternating electric field exists during operation, comprising portions separated by gaps, certain of said separated surface portions constituting one group oscillating in phase with each other but out of phase with other of said surface portions constituting a second group which oscillate in phase with each other during operation of said system in one of said modes, and each of said surface portions being of a width less than one-quarter the free space wave length of oscillation of said one specified mode, electric connections between members of said first group and electric connections between members of said second group, the length of each of said connections between adjacent connection points being less than one-half the free space wave length of oscillation of said mode, said connections being additional to and exclusive of the above-mentioned interconnections between all of said resonators.

2. A high-frequency magnetron device, comprising a cathode, a plurality of resonators disposed circumferentially around said cathode, all conductively interconnected, and electrically coupled when in operation, and constituting a system which is capable of oscillating in a plurality of different modes at the frequencies appertaining thereto, said resonator system having surfaces adjacent to which an alternating electric field exists during operation, comprising portions separated by gaps, certain of said separated surface portions, more than two in number, constituting one group oscillating in phase with each other but out of phase with other of said surface portions, more than two in number, constituting a second group which oscillate in phase with each other during operation of said system in one of said modes, electrical coupling means at both ends of the device coupling together members of said first group in pairs, and electrical coupling means at both ends of the device coupling together all the members of said second group in pairs.

3. A high-frequency magnetron device comprising a cathode, a plurality of resonator rods in juxtaposition thereto, all conductively and mechanically interconnected, and all electrically coupled when in operation, constituting a system which is capable of oscillating in a plurality of different modes, in one of which one group of said rods oscillate longitudinally in phase with each other but out of phase with another group of said rods which oscillate in phase with each other, electrical coupling means between members of said first group, and additional electrical coupling means between members of said second group, both of said means being additional to and exclusive of the above-mentioned conductive interconnections between all of said rods.

4. A high-frequency magnetron device comprising a cathode, a plurality of resonator rods in juxtaposition thereto, all conductively and mechanically interconnected, and at points similarly positioned longitudinally of each, said rods being all electrically coupled when in operation and constituting a system which is capable of oscillating in a plurality of modes, in one of which one group of said rods oscillate longitudinally in phase with each other but out of phase with another group of said rods, the oscillation of the rods, when the device is in operation, being such that there are points therein at which the amplitude of the electric field between the rods is zero, these being the said points at which the rods are connected together, and other points at which the said amplitude is a maximum, electrical coupling means between members of said first group of rods at said last named points therein and electrical coupling means between members of said second group of rods at said last named points therein.

5. A high-frequency magnetron device, comprising a cathode, an anode structure, all parts of which are conductively interconnected, formed to provide a plurality of resonators in juxtaposition to said cathode with a discharge space therebetween, said resonators being thereby electrically coupled when in operation, said device being operable when a magnetic field is produced between said cathode and anode structure and when said cathode is electron-emissive, said structure having surfaces adjacent to which an alternating electric field exists during operation, which surfaces comprise elements separated by gaps, said resonators constituting a system which is capable of oscillating in a plurality of different modes at the frequencies appertaining thereto, in one of which modes one group of less than all of said separated elements oscillate in phase with each other, and electric coupling means between members of said group, additional to and exclusive of the interconnections above-mentioned between all parts of the said structure, and an output connection for said device, having a direct tap on to said additional coupling means.

6. An electron discharge device comprising a cathode and an anode, said anode having a plurality of electron-receiving portions adjacent said cathode, and a plurality of grooved portions spaced from said electron-receiving portions forming a plurality of inductances which together with the interelectrode capacitances constitute a plurality of tuned circuits adapted to oscillate at substantially the same frequency, and relatively short conductors directly interconnecting alternate electron-receiving portions, the length of each of said conductors being less than one-half the free space wave length of the oscillations of said frequency.

JAMES SAYERS.

REFERENCES CITED

The following references are of record in the file of this patent:

UNITED STATES PATENTS

| Number | Name | Date |
|---|---|---|
| 2,147,159 | Gutton et al. | Feb. 14, 1939 |
| 2,227,594 | Linder | Jan. 7, 1941 |
| 2,247,077 | Blewett et al. | June 24, 1941 |
| 2,250,698 | Berline | July 29, 1941 |
| 2,408,235 | Spencer | Sept. 24, 1946 |
| 2,408,903 | Biggs et al. | Oct. 8, 1946 |
| 2,414,084 | Bowen | Jan. 14, 1947 |
| 2,414,085 | Hartman | Jan. 14, 1947 |
| 2,418,469 | Hagstrum | Apr. 8, 1947 |